Sept. 22, 1936.   A. M. WILHELM   2,055,370
LANDING INDICATOR FOR AIRPORTS
Filed May 10, 1930   2 Sheets-Sheet 1
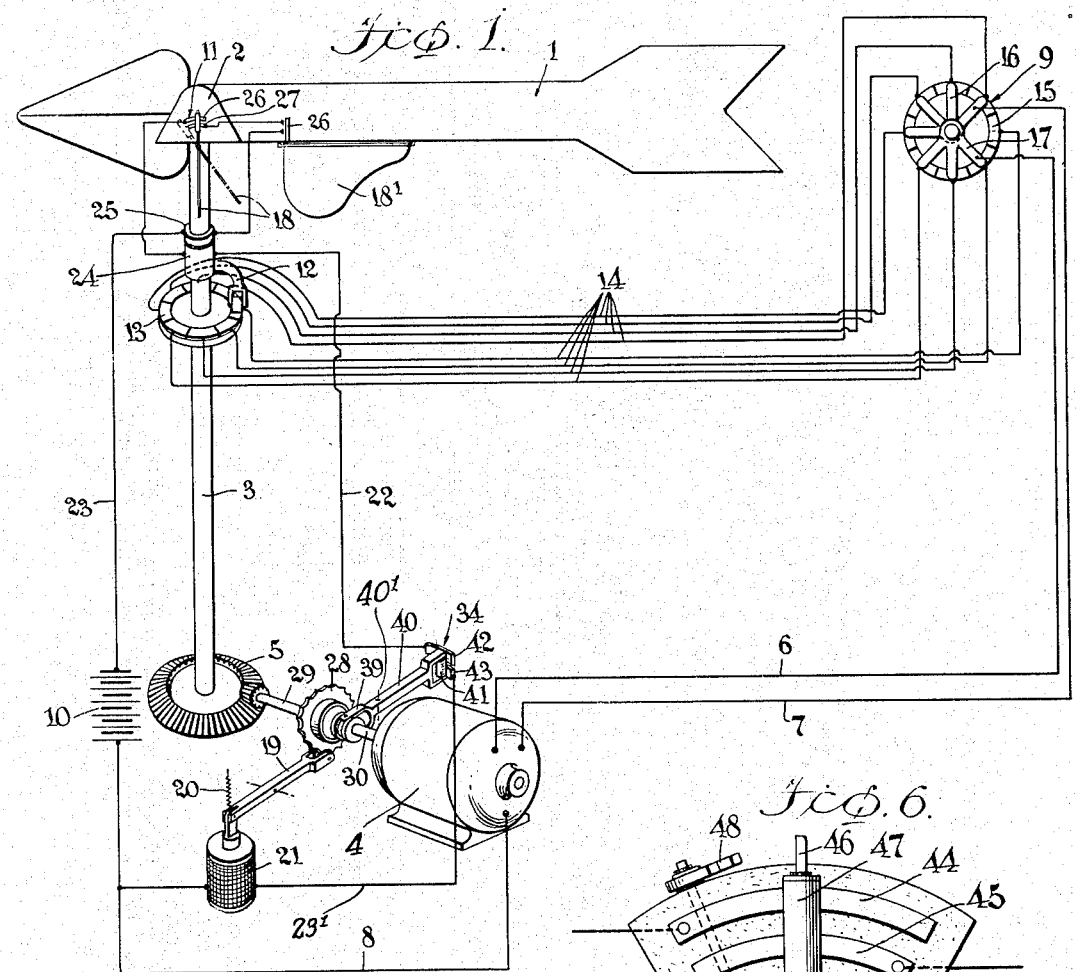
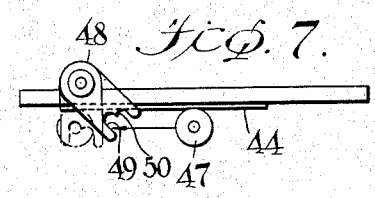
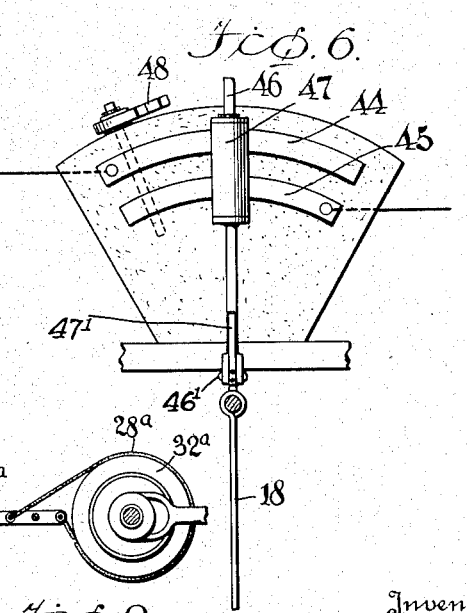
Inventor
Arthur M. Wilhelm,
By Barton A. Beau Jr
Attorney Sept. 22, 1936. A. M. WILHELM 2,055,370
LANDING INDICATOR FOR AIRPORTS
Filed May 10, 1930   2 Sheets-Sheet 2
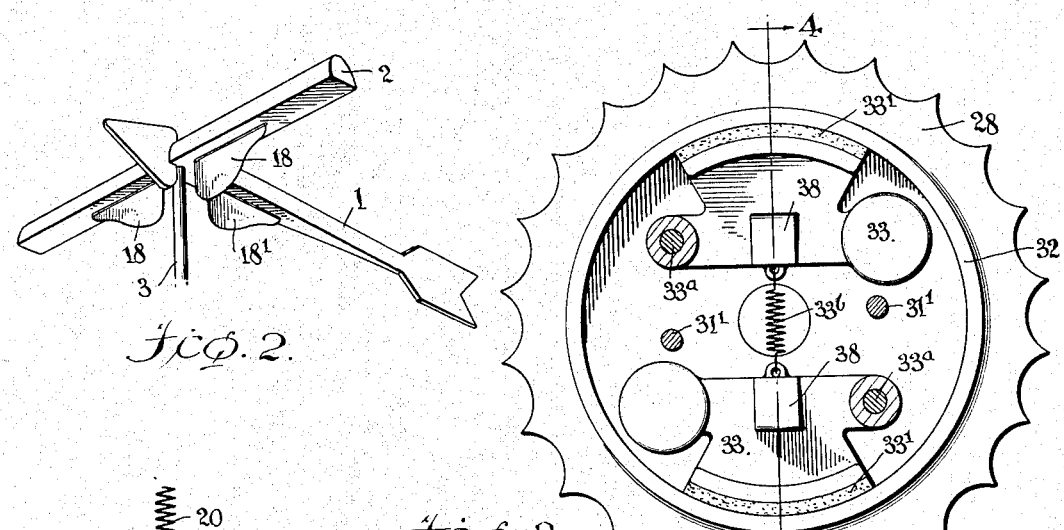
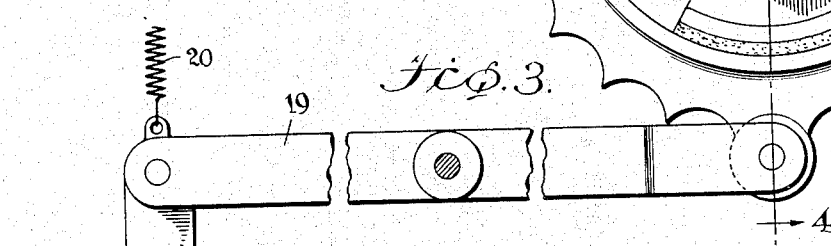
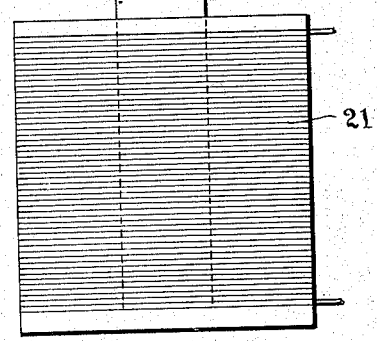
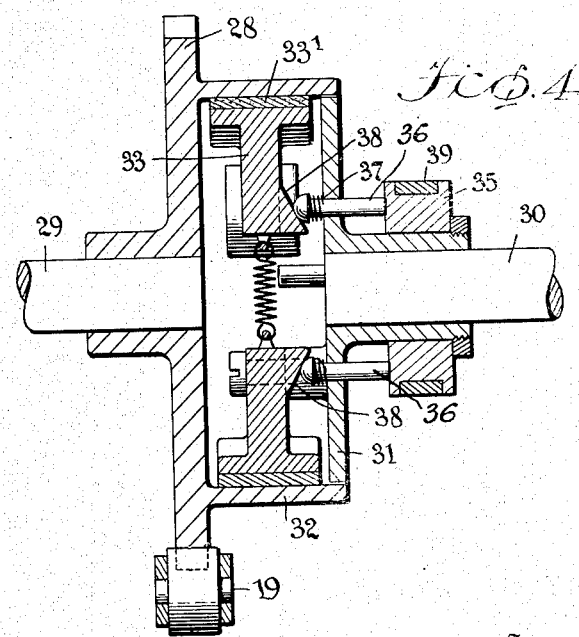
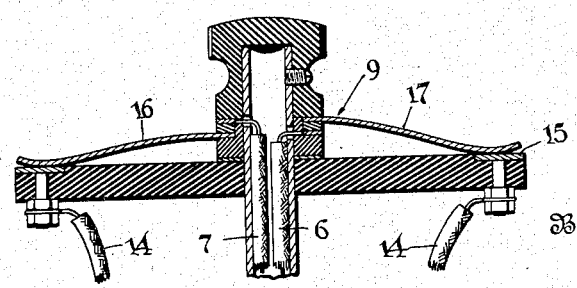
Inventor
Arthur M. Wilhelm,
By Barton A. Beaugh
Attorney Patented Sept. 22, 1936

2,055,370

UNITED STATES PATENT OFFICE 2,055,370

LANDING INDICATOR FOR AIRPORTS

Arthur M. Wilhelm, Randolph, N. Y.

Application May 10, 1930, Serial No. 451,343

26 Claims. (Cl. 73—55)

This invention relates to an indicator for airports for indicating to a flying aviator the safest course or direction in which to effect a landing of his craft in the weather conditions then prevailing, this invention being an improvement on that disclosed in my co-pending application filed November 11, 1929 Serial No. 406,409.

When a wind is prevalent, especially a wind having a velocity above a predetermined degree, it is the rule to bring the airplane down against or into the wind. In calm weather it may be desired to indicate a preferred runway over the others at an airport, and in my co-pending application I disclosed an indicator which would respond to appreciable air currents for indicating the direction of the wind, and when the wind ceased to blow, or practically so, the indicator would automatically return to a predetermined indication for pointing out the preferred runway or the preferred direction for landing the aircraft, all tending toward the safety of the aviator and for the good of the ship.

The present invention has for its object to improve and modify the indicator with respect to its mechanism for effecting the automatic return of the indicator to give a calm weather landing indication; to provide a simplified remote control by which a predetermined selection among the various runways may be readily accomplished; and to provide a landing indicator which will be efficient and reliable in operation, and one having a wind influenced release from a normal locked position whereby the indicator will be free to respond to the action of the wind.

The invention further resides in the features of construction and the combinations and arrangements of parts as will hereinafter appear more fully, reference being made to the accompanying drawings wherein:—

Fig. 1 is a diagrammatic view depicting the general layout of the several parts and circuits.

Fig. 2 is a perspective view of the indicator or pointer per se, looking from beneath.

Fig. 3 is a view of the combined lock, clutch and switch unit, with parts omitted.

Fig. 4 is a vertical section through the unit.

Fig. 5 is a sectional view through the control.

Fig. 6 is a view showing the wind-opened switch.

Figs. 7 and 8 are views depicting the action of the wind-opened switch.

Fig. 9 is a modified indicator lock.

Referring more in detail to the accompanying drawings, the wind responsive indicating means comprises an indicator which may follow the general T configuration of an airplane body, having a stem portion 1 and oppositely extending wing portions 2, and being mounted upon a rotatable support or standard 3 so as to respond to wind currents, when free.

The numeral 4 indicates a source of power, such as an electric motor, which is connected by a speed reduction transmission 5 to the standard 3, the transmission being herein depicted in its simplest form, the thought being to reduce the excessively high speed of the motor to a comparatively slow motion for safely driving or moving the indicator. The office of this power drive is to return the indicator to a predetermined indication or for designating the runway preferred for calm weather landing.

For instance, if the east runway of the airport is the best and most preferred for landing in calm weather and the indicator left by the last prevailing wind indicating a northerly direction, the motor 4 will then come into play through instrumentalities hereinafter set forth and return the indicator to an easterly direction. If the last prevailing wind had been from a southerly direction the motive power will then come into play and return the indicator to the predetermined normal or easterly position. In such a case the indicator could be turned through an angle of 270° to its normal position but suitable means may be provided, such as reversible gearing or as herein depicted a reversible motor, whereby the indicator will be returned to its normal position over the shortest route.

The electric motor circuit for the reversible motor has herein been illustrated diagrammatically as comprising a forward direction circuit wire 6, a reverse direction circuit wire 7 and a common circuit wire 8, the circuit wires 6 and 7 passing from the motor 4 to a remote control generally indicated at 9, and the common circuit wire 8 being connected to the source of electrical energy generally indicated at 10 and thence on to a wind controlled or wind opened switch on the indicator, and generally indicated at 11, returning thence through an indicator controlled distributor brush 12 and ring 13 back to the control 9. The brush 12 is designed to be carried about the stationary distributor ring 13 as the standard 3 is rotated, the ring being composed of a series of contacts or segments electrically insulated from each other and in turn electrically connected by wires 14 to corresponding contacts 15 arranged on the control 9. For the purposes of illustration I have shown eight contacts 15 on the control 9 corresponding to the eight directions N., N. E., E., S. E., S., S. W., W., and N. W. A pair of fingered contacts 16 and 17 coaxially mounted on the control 9 but insulated from each other, provide for the necessary closing of the electric circuit through seven of these eight contacts 15. In the illustration the fingered plate 16 is provided with four fingers while the plate 17 is provided with three fingers and these plates mutually co-act to connect the wires 6 and 7 with seven of the contacts of the distributor ring 13. Thus, the "dead" contact, or that one not in the circuit, will determine the stopping position of the indicator, and since the contacts 16 and 17 are mounted for adjustment this stopping point may be pre-selected.

The switch 11 is opened by a wind responsive device 18 herein shown in the form of a vane pivotally mounted on the indicator, the action of the wind being to swing the vane to a position for opening the switch 11 thereby breaking the motor circuit. Consequently, the brush 12 will be free to ride about the annular series of distributor contacts without closing any electric circuit.

If the wind has died down so that the wind responsive device 18 is permitted to return to its normal position and close the switch 11 the circuit will then be through the switch, through the brush 12 and the one of the distributor contacts with which it is making contact, thence through the control 9 and through one or the other of the wires 6 and 7 depending upon which of the plates 16 and 17 is in circuit with the engaged distributor contact. The motor will then begin functioning to rotate the indicator, bringing the brush 12 over the successive contacts or segments until the "dead" contact is reached, or that one which is connected to the contact 15 out of engagement with the plates 16 and 17. Thereupon the motor will cease functioning and the indicator brought to rest at the desired position.

In its normal calm weather landing position the indicator is preferably locked to hold the same against unauthorized movement. The switch 11 being closed in this position, it is utilized to energize and bring into function an electric lock which in a simple embodiment comprises a latch member 19 urged to an inoperative position by a spring 20 and to an operative position by an electric device such as the solenoid 21, the latter being connected by the circuit wires 22 and 23, through collector rings 24 and 25 to the contacts 26 and 27 of the switch 11. The action of the solenoid 21 moves the latch 19 into locking engagement with a part connected to the standard 3. In the form illustrated this part comprises a toothed wheel 28, the latch 19 being designed to engage with the teeth of the wheel 28 to hold the same against rotation and thereby lock the indicator against being tampered with. When the wind starts blowing again it will actuate the vane 18 to open the switch 11 and release the solenoid 21 whereby the toothed wheel 28 will be disengaged and the indicator released for responding to wind currents. The toothed wheel is herein depicted on the shaft 29, but it obviously could be located on the support 3 although this disposition is not herein shown.

To avoid placing any unnecessary burden on the indicator when responding to the wind currents, such as might be the case if the motor and transmission parts had to be moved by the wind propelled indicator, I provide means for declutching the drive from the indicator when the motor 4 is inactive. This declutching mechanism is illustrated as comprising a centrifugal clutch disposed between the driven shaft 29 and the drive shaft 30, consisting of a disk 31 on the latter shaft operating within a drum 32 and carrying one or more weighted arms 33.

These arms are pivoted at 33a and urged inwardly from the drum by a spring 33b, a stop 31' being arranged on the disk 31 to support their free ends when idle. Therefore, when the motor 4 is brought into play the weight-carried arms will be set in rotation and through the centrifugal action set up clutch the drum 32 so that the driving power of the motor will be transmitted to the standard 3 for rotating the same.

From the foregoing it will be observed that when the wind ceases, and the vane 18 returns to its normally vertical position to close the switch 11, that the motor circuit will be closed providing the brush 12 is in contact with one of the live segments of the fixed ring 13. Since when the switch 11 is closed the toothed wheel 28 is locked against rotation by the energized solenoid 21, means must therefore be provided for releasing the toothed wheel 28 during operation of the motor.

To this end I provide means for automatically breaking the solenoid circuit when the motor 4 is set in operation. Herein, this means is shown as comprising a centrifugal switch generally indicated at 34 and, to simplify the construction, I have combined the same with the clutch, slidably mounting on the shaft 30 a grooved collar 35 carrying one or more pins 36 which are slidably mounted in the disk 31 and urged inwardly by springs 37, said springs holding the inner ends of the pins 36 against beveled faces 38 on the weighted arms 33 so that as the arms are swung outwardly under the centrifugal force the beveled faces 38 will ride beneath the pins 36 and shift the latter outwardly and thereby slide the collar 35 along the shaft 30 and away from the disk 31. Engaged in the groove of the collar 35 is a yoke 39 mounted on one end of a lever 40 pivoted medially of its ends about axis 40', a contact collar 41 being carried by the opposite end of the lever for riding off a pair of contacts 42 and 43 which are in turn connected into the circuit wires 23 and 23' of the solenoid circuit. Therefore, as the motor picks up momentum, and preliminary to the clutch faces 33' effectively engaging the surrounding drum 32, the weighted arms 33 will shift the roller 41 from off the contacts 42 and 43 thereby breaking the solenoid circuit and permitting the spring 20 to disengage the latch 19 from the toothed wheel 28 so that by the time the clutch faces 33' become effective the standard 3 will be free to turn. It will be understood that when the weighted arms 33 are retracted (when the motor is inoperative) the pins 36 will not engage the beveled or cam surfaces 38 so that the springs 37 will move the pins, and collar 35 which carries them, to the left as the device is viewed in Fig. 4, thereby moving the lever 40 to the position shown in Fig. 1, where contacts 42, 43 are closed to energize the solenoid 21 locking circuit.

In the showing the toothed wheel 28 of the lock has been combined with the clutch and centrifugal switch as a unit, thereby simplifying the construction and reducing the number of parts thereof.

In Fig. 6 I have shown an embodiment of a switch which is opened and closed by the action of the wind responsive member 18, the same comprising a pair of contacts 44 and 45 connected respectively to the rings 24 and 25 of the motor and solenoid circuits. An arm 46 extended upwardly from the vane 18 carries a contact roller 47 designed to roll onto and off from the contacts 44 and 45 for closing circuit therethrough.

Means are provided in this switch to delay the closing of the circuits therethrough until the velocity of the wind has effected a mean drop to a point below that required to free the indicator, as when the roller 47 rides off of the contacts 44 and 45. This may be accomplished by pivoting the arm 46 about pivot pin 46' to permit the roller being swung away from the contacts 44 and 45 and then providing means for swinging said roller away as the latter approaches said contacts, the arm 46 being urged toward the contacts by a resilient or spring member 47'. Mounted adjacent the path of movement of the outer end of the arm 46 is a pivoted kicker member 48 formed with a slot 49 and a raised shoulder 50 therein. When the arm 46 is moved by the wind into the slot 49 it will merely pivot the kicker while the roller 47 remains in contact with the strips 44 and 45 for their full length and until it rides thereoff. The movement of the roller off the contact strips disposes the shoulder 50 in the path of the arm 46 to be engaged thereby on the return movement, as when the wind dies down. Thereupon the arm 46 will engage the shoulder 50 and be lifted thereby, as the kicker pivots outwardly from the contact strips 44 and 45 and finally lowered to bring the roller 47 down onto the contact strips at a distance inwardly from their ends. This action provides against sudden gusts of wind or slight variations thereof "chattering" or intermittently setting the mechanism on and off until a substantial change in the wind velocity occurs.

Several wind responsive devices 18 may be disposed at convenient locations and preferably on the indicator, the side wings 2 herein each carrying a vane while a third vane 18' may be mounted on the body portion 1 at right angles to the vanes 18 in the event that a wind rises from a calm at right angles to the face plane of the vanes 18 whereby the full benefit of the wind will be received by the vane 18' for releasing the indicator mechanism through the breaking of the solenoid circuit. Thus the vane 18' will obviously be provided with a switch similar to switch 11 omitting, if desired, the kicker feature since, as soon as the indicator begins to respond to the wind currents and brings the faces of the vanes 18 around into the wind, the switches of the vanes 18 will open to maintain an open solenoid circuit. Therefore, the switches of the several vanes will be connected in series, as indicated in Fig. 1.

The contact strips 44 and 45 are of a predetermined length so that the roller 47 may roll off from engagement therewith at either end thereof, and consequently, should a wind arise out of a calm to the rear and blow the vanes 18 forwardly the solenoid circuit will nevertheless be broken so as to free the indicator for a wind responsive movement.

From the foregoing it is believed that the operation of the improved device will be readily understood; that by manipulating the control 9, that is adjusting the plates 16 and 17 so as to leave the desired contact 15 dead or open, the corresponding segment in the fixed ring 13 will also become dead and determine the normal calm weather landing position. With this adjustment made the motor 4 will set the indicator at this predetermined position.

Now, should a wind arise contrary to the normal calm weather position the wind responsive devices will break the solenoid circuit, release the indicator for free responsive movement to the wind currents, the driving mechanism being disconnected therefrom by the centrifugal clutch.

If a dying wind should leave the indicator in a position other than that predetermined for a calm weather landing, with the brush 12 engaging one of the live segments of the ring 13; when the vane 18 returns to its normally vertical position and closes the switch 11, not only will the solenoid 21 become energized to latch the indicator but the motor circuit will also be energized through the following circuit;—the brush 12, the live segment of the ring 13, the corresponding wire 14 and the respective live contact 15, the corresponding plate 16, 17, the respective wire 6, 7, the motor 4, the wires 8 and 23, collector ring 25, the switch 11 and back through collector ring 24 to brush 12—, whereupon the motor will begin rotating, not only setting in action the centrifugal clutch but also throwing out the centrifugal switch so that by the time the clutch becomes effective the indicator will have been released from the electric lock 19, 21, and as the motor 4 becomes clutched to the indicator the latter will be rotated in either one or the other direction back to its normal position as indicated by the dead segment of the ring 13, it being understood that this dead segment is rendered inactive by the selective placement of the fingered plates 16, 17 at the control 9.

Consequently, the indicator will be returned to its normal calm weather position whereupon the motor circuit is broken by the brush 12 riding onto the dead segment; the motor 4 stopping, the centrifugal clutch releasing the indicator from its drive, and the centrifugal switch 34 closing to render the solenoid 21 active, thereby locking the indicator in such calm weather landing position.

The contacts 26 and 27 of the switch 11 may be connected to the collar rings 24 and 25 in a suitable manner and the circuit wires 22 and 23 brought into electric contact with the segment rings by suitable take-off brushes not shown but obviously well known in the electrical art. For simplification, the contact ring 24 may be formed as an extension to the collar which carries the brush 12.

In place of the toothed wheel and pawl type of lock I may use a band brake 28a placed about the drum 32a and applied thereto by the lever 19a which in turn is actuated by the solenoid 21 and spring 20.

What is claimed is:

1. An indicating mechanism for airports, comprising a wind-responsive indicating means, means for locking the same for a calm weather landing indication, wind-responsive means for rendering said locking means inoperative, and means for returning the indicating means to the calm weather landing indication when left at another indication by a dying wind.

2. Indicating means for airports, comprising an indicator mounted for directional movement in response to wind currents, mechanism releasably connected to the indicator for returning the same to a predetermined calm weather landing indication, and wind released means for holding the indicator at its calm weather landing indication.

3. An indicating mechanism for airports, comprising a wind-responsive indicator, means for preselecting a calm weather landing indication for the indicator, means normally disengaged from the indicator but engageable therewith for returning the indicator to the calm weather landing indication when left at another indication by a dying wind, and means for automatically engaging the returning means with said indicator by and during operation of said returning means.

4. Indicating means for airports, comprising an indicator mounted for directional movement in response to wind currents, power operated means for returning the indicator to a pre-selected position, pre-selecting means for determining the pre-selected position and including an electric circuit for setting in operation said power operated means, and a wind-opened switch in the circuit carried by the indicator for breaking the same to render the power operated means inoperative when the indicator is responding to wind currents.

5. Indicating means for airports, comprising an indicator mounted for directional movement in response to wind currents, power operated means for returning the indicator to a pre-selected position, pre-selecting means for determining the pre-selected position and including an electric circuit for setting in operation said power operated means, a series of contacts and a cooperating brush movable by the indicator for successively engaging the series of contacts and thereby successively closing the circuit through the engaged contact, means for selectively rendering one contact of said series dead whereby the circuit will be broken when the brush engages said selected contact, and a wind-opened switch for breaking the circuit to insure of the power operated means remaining inactive for the proper response of the indicator to the wind influences.

6. Indicating means for airports, comprising an indicator mounted for directional movement in response to wind currents, power operated means for returning the indicator to a pre-selected position, pre-selecting means for determining the pre-selected position and including an electric circuit for setting in operation said power operated means, a series of contacts and a cooperating brush movable by the indicator for successively engaging the series of contacts and thereby successively closing the circuit through the engaged contact, means for selectively rendering one contact of said series dead to break the circuit when engaged by said brush for causing the indicator to stop at a predetermined indication, a lock for holding the indicator at said predetermined indication during calm weather, electric means including a circuit for holding said lock operative, and wind operated means for holding both circuits open when the indicator is responding to wind influences.

7. An indicating device for airports, comprising an indicator responsive to wind currents for indicating their direction of flow, a drive therefor, a fixed series of contacts and a cooperating brush movable by the indicator in successive engagement with the contacts, a control having a series of contacts electrically connected respectively to the first contacts, means for selectively connecting the control contacts with the drive, said selective means omitting connection with a selected one of said control contacts whereby the respective contact of the first series is rendered electrically dead, the remaining contacts of both series being connected in circuit with the drive, and a wind-opened switch in the circuit.

8. An indicating device for airports, comprising an indicator responsive to wind currents for indicating their direction of flow, a drive therefor, a fixed series of contacts and a cooperating brush movable by the indicator in successive engagement with the contacts, a control having a series of contacts electrically connected respectively to the first contacts, means for selectively connecting the control contacts with the drive, said selective means omitting connection with a selected one of said control contacts whereby the respective contact of the first series is rendered electrically dead, the remaining contacts of both series being connected in circuit with the drive, a switch in the circuit with said contacts, and a wind-moved vane carried by the indicator for opening the switch in a wind.

9. An indicating device for airports, comprising a substantially T-shaped indicator having a stem portion and oppositely extending wings at one end, means rotatably supporting the indicator for wind responsive movements, wind-moved vanes movably carried by the stem portion and wings and relatively disposed at right angles to each other for being acted upon by varying winds, means for holding the indicator against movement from a calm weather landing indicator, said holding means being electrically actuated and including a circuit, and switch means in the circuit and openable by wind movement of said vanes to free the indicator for responding to the wind influence.

10. An indicating device for airports, comprising an indicator, a rotatable support therefor, a reversible power drive, an electric lock for holding the indicator in a calm weather landing indication, a circuit including the lock, a wind-opened switch in the circuit to open the circuit and thereby free the indicator from the lock for responding to wind influences, an automatic switch in the circuit for breaking the latter when the drive is in operation, and means for setting the drive in operation when the indicator is at other than a calm weather landing indication during calm weather.

11. An indicating device for airports, comprising an indicator, a rotatable support therefor, a reversible power drive, an electric lock for holding the indicator in a calm weather landing indication, a circuit including the lock, a wind-opened switch in the circuit to open the circuit and thereby free the indicator from the lock for responding to wind influences, an automatic switch in the circuit for breaking the latter when the drive is in operation, a series of contacts, a brush operable by the indicator for wiping the contacts in succession, a second series of contacts electrically connected to the several contacts of the first series in order, an adjustable pair of contact members selectively engageable with all but one contact of said second series thereby to determine the positioning of the indicator in calm weather, said contact members being electrically connected to the reversible drive, one for forward operation and one for reverse operation of the drive, and an electric circuit including the two series of contacts, the contact members, the brush and said wind-opened switch.

12. An indicating device for airports comprising wind responsive indicating means adapted for directional positioning to indicate any one of a plurality of directions for guiding an airplane in landing, means for setting the first means at a predetermined indicating position in the absence of contrary wind currents, said setting means including an electric circuit, a switch in said circuit, wind actuated means for controlling the switch, and means interposed between the wind actuated means and the switch for effecting a delayed re-closing of the switch with respect to the wind velocity required to open the switch.

13. In combination with indicating means responsive to wind currents and adapted for directional positioning to indicate any one of a plurality of directions for guiding an airplane in landing, a drive for moving the indicating means to a predetermined position, means for rendering the drive inoperative when the indicating means is in a predetermined calm weather landing position, means for rendering the drive inoperative in a wind of a predetermined velocity to permit the indicating means having wind responsive movement, means for holding the indicating means in its calm weather position, said holding means including a solenoid, a switch in circuit therewith and normally closed whereby the solenoid is rendered operative during calm weather for rendering the holding means operative, and wind responsive means for opening the switch to deenergize the solenoid and release the indicating means from said holding means whereby the indicating means is free for wind responsive movements.

14. In combination with indicating means responsive to wind currents and adapted for directional positioning to indicate any one of a plurality of directions for guiding an airplane in landing, a drive for moving the indicating means to a predetermined position, means for rendering the drive inoperative when the indicating means is in a predetermined calm weather landing position, means for holding the indicating means in its calm weather position, and wind responsive means for freeing the indicating means from said holding means and also from said drive.

15. In combination with wind responsive means for directing the landing of airplanes at airports, a rotatable support therefor permitting wind responsive movement thereof, a drive for said support operable to return the wind responsive means to a predetermined position in the absence of a predetermined wind, means for rendering the first means free of said drive for wind responsive action, means for holding said support against movement including an energized solenoid, and means for deenergizing the solenoid by and during operation of the drive for releasing the directing means to be moved by said drive.

16. In combination with a wind responsive indicator, a rotatable support therefor, a stationary support, an electrical bridging device between said supports including a brush carried by one support and an annular series of contacts carried by the other support and with which the brush has wiping contact, an electric drive for the rotatable support to return the indicator to a predetermined position, wind controlled means for freeing the drive from the indicator to permit movement of the latter by the wind, means selectively connecting the series of contacts with the drive whereby a predetermined one of said contacts may be inactively related with respect to the drive to determine such indicator position, and means for disengaging the drive from the rotatable support when the brush is engaged with said one of the contacts which is unconnected with the drive.

17. An indicating mechanism for airports, comprising a wind-responsive indicator, means for holding the same against movement in a predetermined position, wind-responsive means for rendering said first means inoperative to permit the indicator to respond to the wind action, means for returning the indicator to the predetermined position when left elsewhere by a dying wind, and means for rendering the holding means inoperative during operation of said returning means.

18. A landing indicating device for airports, comprising an indicator responsive to wind currents for indicating their direction of flow, a drive therefor, a power transmission connecting the drive to the indicator, said transmission including a clutch automatically rendered operative by and during operation of the drive and rendered inoperative when the drive is rendered inoperative whereby the indicator is free of the drive to respond to wind influences, and means automatically setting the drive in operation to move the indicator to a predetermined position when left otherwise disposed by a dying wind, said last mentioned means rendered inoperative by a predetermined wind.

19. A landing indicating device for airports, comprising an indicator responsive to wind currents for indicating their direction of flow, a drive therefor operable to return the indicator to a predetermined position in the absence of a predetermined wind, a power transmission between the drive and indicator and including a clutch automatically operating to clutch the drive to the indicator when the drive is operative and to declutch the indicator from the drive when the latter is inoperative whereby the indicator is free of the drive to respond to the wind currents, means for holding the indicator against movement from such predetermined position, means for determining said position, and wind controlled means for rendering the drive inoperative during wind responsive action of the indicator.

20. A landing indicator for airports comprising a wind controlled indicating device, power-operated means for moving the indicating device to an indicating position, and means responsive to wind velocity for controlling said power-operated means, said wind-responsive means including a pair of hinged members for presenting surfaces to the wind for movement from a normal position to a degree in accord with wind velocity, the hinge axis and exposed surface of one of said members being disposed in angular relationship to the other of said members, whereby the wind will be effective against the wind-responsive means regardless of its direction.

21. In a landing indicator for airports, a wind controlled indicator, power-operated means for moving said indicator to a predetermined position, wind-responsive means for rendering said power-operated means inoperative, said wind-responsive means being operative when the wind velocity is above a predetermined degree, and means associated with said wind-responsive means for retaining the latter operative after once becoming operative until the wind velocity has decreased to a degree substantially less than said predetermined degree.

22. In a landing indicator for airports, a wind controlled indicator movable to various direction-indicating positions, means for holding said indicator against movement in the absence of wind of a predetermined velocity, means responsive to wind velocity rendering said holding means operative until the wind velocity increases to a predetermined degree, and means for maintaining effective said means responsive to wind velocity until the wind velocity decreases to a degree substantially less than said predetermined degree.

23. In a landing indicator for airports, a wind vane mounted for movement by the wind about a substantially vertical axis whereby the vane will normally point into the wind, means for rotating the vane about said axis to a predetermined position in the absence of wind of more than a predetermined velocity, means for locking the vane in said predetermined position, and means for rendering said locking means ineffective when wind of more than said predetermined velocity prevails.

24. In a landing indicator for airports, an indicator, means for moving the indicator to a predetermined indicating position, control means responsive to wind velocity for setting the first mentioned means into operation when the wind velocity is less than a predetermined degree and for rendering the first mentioned means inoperative when the wind velocity exceeds said predetermined degree, and means for preventing a change in the effect of said control means for a time after the wind velocity decreases below said predetermined degree.

25. In a landing indicator for airports, an indicator, electrically operated means including an electrical circuit therefor for moving the indicator to a predetermined position, control means responsive to changes in wind velocity for opening and closing said electrical circuit, and means rendering said control means unresponsive to decreases in wind velocity until the wind velocity decreases to a predetermined degree.

26. In a landing indicator for airports comprising an indicating body responsive to wind of predetermined velocity to indicate the wind direction, means supporting the indicating body for movement, mechanism for driving the indicating body to a predetermined position in the absence of wind of such velocity, an electric circuit for controlling said mechanism, wind actuated means included in the circuit for controlling the action of said mechanism, and means effective in the presence of wind of such velocity for freeing the indicating body from said mechanism.

ARTHUR M. WILHELM.